Feb. 14, 1928.                                                                           1,659,365
I. M. LADDON ET AL
WHEEL
Filed April 6, 1927
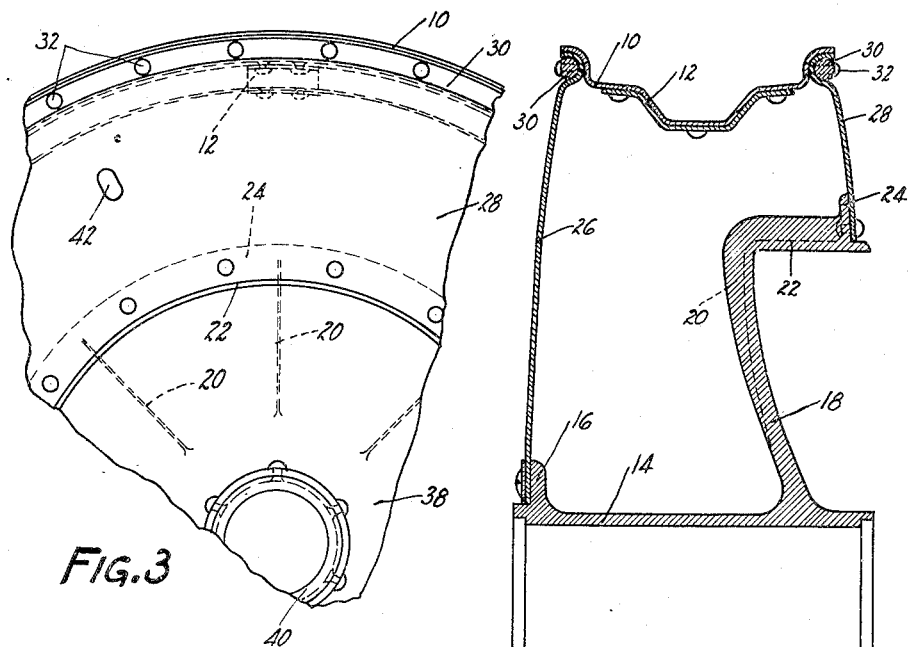
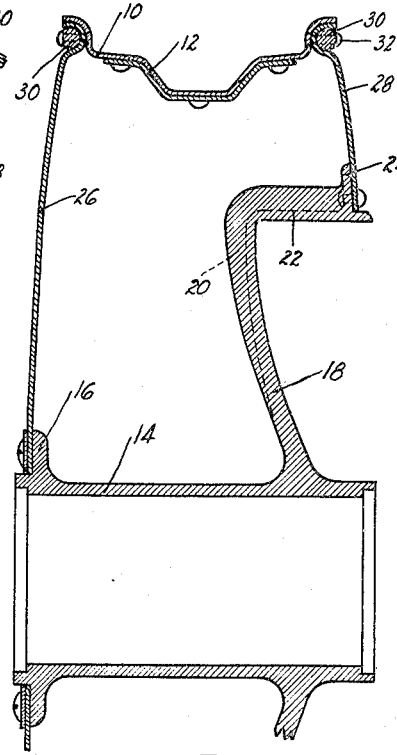
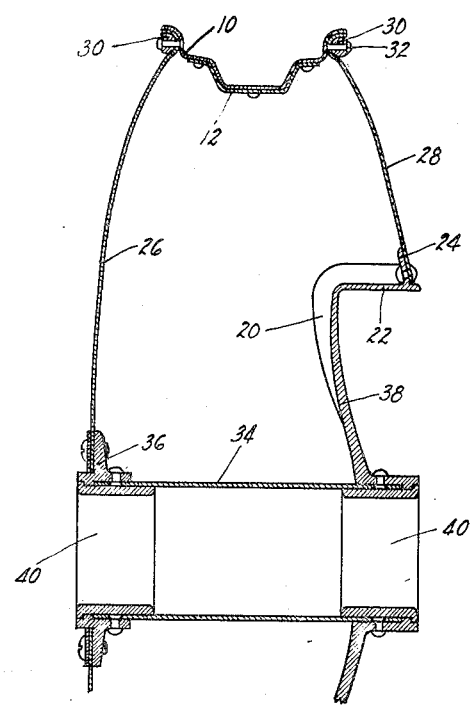
INVENTORS
ISSAC M. LADDON
WILLIAM A. RING
FRED W. HERMAN
BY: M. W. McConkey
ATTORNEY Patented Feb. 14, 1928.

1,659,365

UNITED STATES PATENT OFFICE.

ISAAC M. LADDON, WILLIAM A. RING, AND FRED W. HERMAN, OF DAYTON, OHIO, ASSIGNORS TO BENDIX BRAKE COMPANY, OF CHICAGO, ILLINOIS, A CORPORATION OF ILLINOIS.

WHEEL.

Application filed April 6, 1927. Serial No. 181,350.

This invention relates to wheels and is illustrated as embodied in a light but strong wheel intended for use on a very heavy aeroplane. An object of the invention is to make the wheel as light and as strong as possible, especially by adapting the structure for the use of duralumin, by utilizing a brake drum as part of the wheel. Preferably the hub of the wheel has at one end an outwardly-extending flange formed with a brake drum flange at its outer edge, and the rim or equivalent outer part of the wheel is connected to the hub by two disks, one of which is secured to the outer end of the hub and the other of which is secured to the edge of the brake drum flange. The hubs are shown in the drawing as provided with short radial flanges adjacent their outer ends and adjacent the inner edges of the brake drum flanges, to which radial flanges the inner edges of the disks may be riveted or otherwise secured.

Other objects and features of the invention, including various novel and desirable particular constructions, will be apparent from the following description of two illustrative embodiments of the invention shown in the accompanying drawing, in which:

Figures 1 and 2 are partial diametric sections through two wheels embodying the invention; and Figure 3 is a partial inside elevation of the wheel of Figure 2.

Each of the wheels includes a rim, or equivalent outer annular member, shown as a drop-center rim 10 formed by rolling a strip of duralumin and securing its ends together by a member 12 underlying and riveted to said ends.

The hub of the wheel in Figure 1 is a duralumin casting 14 having at its outer edge a short radial flange 16 and having adjacent its inner edge an outwardly extending inner member 18 (which may be reinforced by radial ribs 20), which is provided at its outer edge with an inwardly-facing brake drum flange 22 which is formed with a short radial flange 24. The radial flanges 16 and 24 are so arranged as to form rabbeted recesses for the inner edges of duralumin disks 26 and 28 which are seated at their inner edges in these rabbeted recesses and which are rolled or spun at their outer edges to embrace reinforcing rings 30. The outer portions of the disks 26 and 28 underly the edges of the rim 10; that is, the edge portions of the disk and of the rim are rolled together over the reinforcing rings 30. Rivets or other fastenings 32 may be inserted through the superposed portions of the disks and of the rim and through the rings 30.

The wheel shown in Figures 2 and 3 differs from that described above in that the hub is built up of a section 34 of tubing, embraced at one end by a cast duralumin sleeve 36 formed with a rabbeted flange for the inner edge of disk 26 and embraced at its opposite end by a casting 38 formed with a brake drum flange 22 as described above. Sleeves 40 are inserted in opposite ends of the tube 34 to receive the wheel bearings.

It will be seen that by this construction a very strong wheel is provided which can be manufactured almost entirely of duralumin so that it has the light weight which is so advantageous in use for aeroplanes, while at the same time it is strong enough to carry a load of several tons. Moreover, the wheel is adapted to be used with a brake without necessitating the additional weight of a separate brake drum. As it is seldom necessary to demount either the wheel or tire on an aeroplane, we consider it unnecessary to utilize any of the conventional demountable rim constructions or to provide for demounting the wheel separately from its hub, although this may be done if the wheel is used for motor trucks or the like. When used on an aeroplane, it is preferable to utilize the rim directly as part of the wheel, as herein described, in which case the usual inflatable tire may be mounted directly on the rim, the tire preferably being provided with an angular valve stem extending through an opening 42 in one of the disks 26 or 28.

While two illustrative embodiments have been described in detail, it is not our intention to limit the scope of the invention to those particular embodiments or otherwise than by the terms of the appended claims.

We claim:

1. A wheel comprising, in combination, a hub having rigid therewith at its inner end an outwardly-extending disk-like member formed with an inwardly-extending brake drum flange, an outer annular member coaxial with respect to the hub, and a pair of disks formed separately from said hub and secured at their outer edges to said member and the outer of which is secured to the outer end of the hub while the inner is secured to said brake drum flange.

2. A wheel comprising, in combination, a hub having at its outer end a short radial flange and at its inner end an outwardly-extending disk-like member formed with an inwardly-extending brake drum flange which also has a short radial flange, an outer annular member coaxial with respect to the hub, and a pair of disks secured at their outer edges to said member and secured respectively to said short radial flanges.

3. A wheel comprising, in combination, a hub including a tube having inner reinforcing sleeves at both ends and which is encircled at both ends by reinforcing sleeves, the inner one of said encircling sleeves being formed with a brake drum, and a pair of wheel disks secured respectively to the outer of the encircling sleeves and to the brake drum.

In testimony whereof, we have hereunto signed our names.

ISAAC M. LADDON.
WILLIAM A. RING.
FRED W. HERMAN.